Oct. 6, 1925.

C. E. KIMBALL 1,555,987

BRAKE FOR ELEVATORS

Filed Jan. 31, 1922    2 Sheets-Sheet 1

Chas. E Kimball INVENTOR.

BY Clem. J. Kimball

ATTORNEY.

Oct. 6, 1925.

C. E. KIMBALL 1,555,987

BRAKE FOR ELEVATORS

Filed Jan. 31, 1922  2 Sheets-Sheet 2

Chas. E. Kimball INVENTOR.
BY Clem F. Kimball
ATTORNEY.

Patented Oct. 6, 1925.

1,555,987

UNITED STATES PATENT OFFICE.

CHARLES E. KIMBALL, OF COUNCIL BLUFFS, IOWA.

BRAKE FOR ELEVATORS.

Application filed January 31, 1922. Serial No. 533,060½.

*To all whom it may concern:*

Be it known that I, CHARLES E. KIMBALL, a citizen of the United States, residing at Council Bluffs, in the county of Pottawattamie and State of Iowa, have invented a new and useful Improvement in Brakes for Elevators, of which the following is a specification.

My invention relates to improvements in elevator brakes in which the field magnets acting upon the armature of the motor are utilized to release the brakes when starting and the objects of my improvements are, first, to utilize an endwise movement of the armature of the driving motor in connection with the rotary movement of the armature under the influence of the motor fields to remove and apply a brake to the driver mechanism; second, to utilize the magnetic fields of the motor and the armature so that the driving current will regulate the application of the brake to the driven mechanism somewhat proportionately to the load on the motor, preventing the drifting of the moving mechanism when applied to elevators; third, to provide such a brake on a driven mechanism operated by the varying current of the motor by such connections between the armature and the driven mechanism as to prevent excessive shock and noise.

I attain these objects by the mechanism illustrated in the accompanying drawing, in which:—

Figure 1:
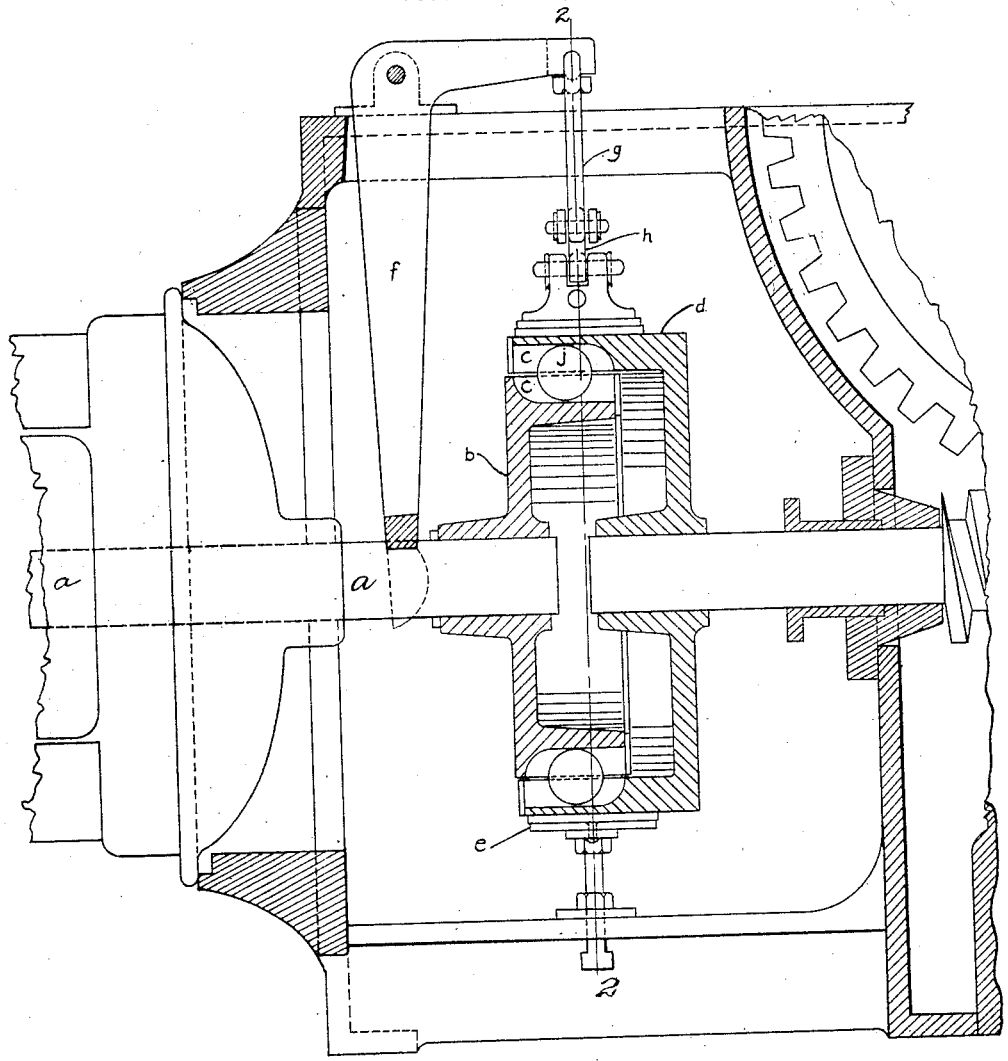
Figure 3:
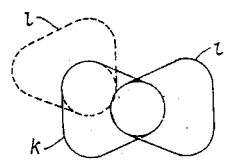
Figures 2, 4:
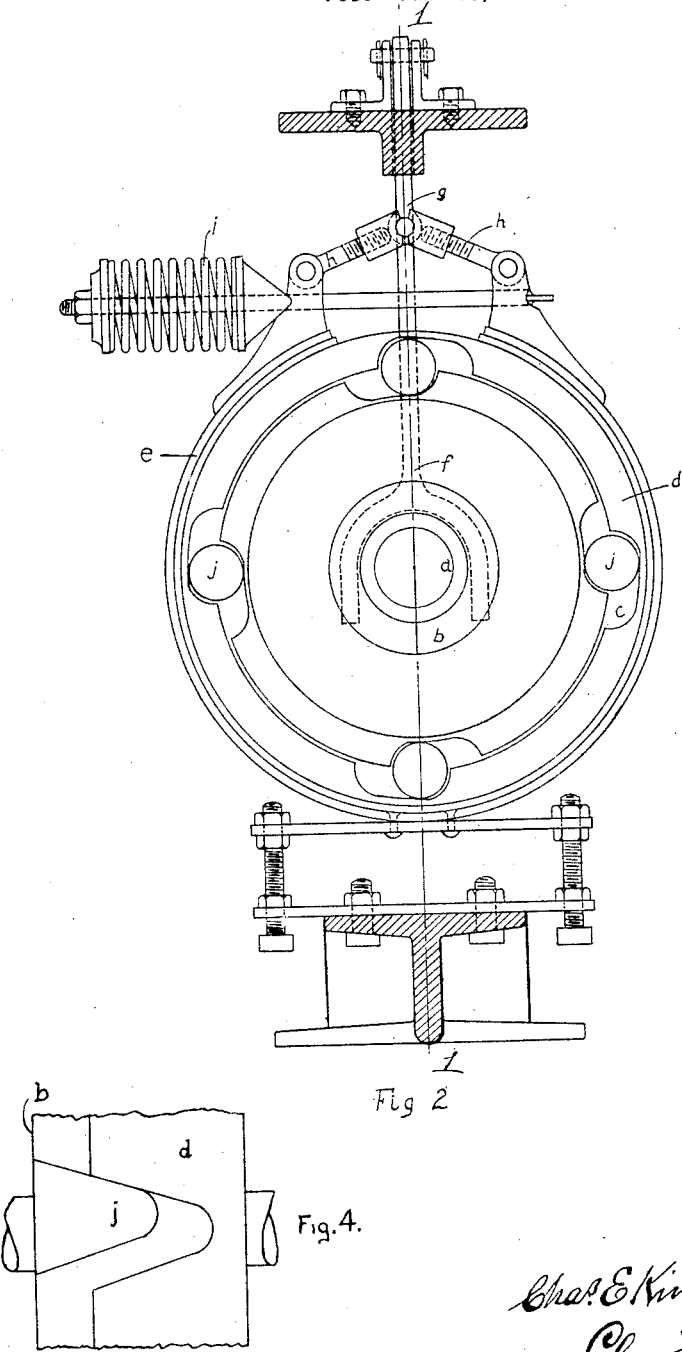

Fig. 1 is a vertical cross-section through the line 1—1 of Fig. 2; Fig. 2, is a vertical cross-section through the line 2—2 of Fig. 1; Fig. 3, is a diagram of the double incline of the connecting means when noiseless and frictionless balls are used; Fig. 4, is a detail cross-section of the engagement of the armature coupling with the coupling on the driven mechanism here shown to be an elevator worm shaft.

The armature shaft $a$, of any ordinary reversible electric motor is arranged to move endwise away from the center of the motor field in which the armature runs when the motor is working. Upon the shaft $a$, a suitable coupling $b$, is placed to turn and move longitudinally with the shaft $a$; $d$, is the ordinary coupling and brake-drum of a driven mechanism, such as an elevator worm gear with which this device is especially adapted to be used although it may be used in any place where the driven mechanism is to be stopped at a definite place unaffected by the load of the mechanism; $e$, is the brake adapted to expand and contract on the brake-drum $d$; $f$, $g$, and $h$, are the usual lever and connections adapted to relieve the brake against the spring $i$; the spring $i$, furnishing the braking force to the brake $e$; the lever $f$, operating the brake $e$, is arranged to engage the armature shaft $d$, so that a movement of the armature towards the center of the motor fields will move the lever $f$, to relieve the brake $e$, upon the brake-drum $d$; the coupling head $b$, engaging the brake-drum $d$, by suitable projections as $j$. The engagement of the coupling $b$, with the brake-drum $d$, is on an inclined plane so that when a current is turned on the motor in addition to the pull of the fields endwise, by the torsion of the armature before the energy of the motor is applied to move the driven mechanism, the armature will move the lever $f$, to release the brake $e$, and this inclined engagement of the armature coupling with the driven member is in both directions so as to accommodate the forward and reverse motion of the motor to drive the driven mechanism in either direction.

For the purpose of relieving shocks and eliminating noise and friction, I prefer to engage the coupling $b$, with the driven brake-drum $d$, by the use of balls of suitable composition. Among various compositions which may be used for this purpose I find rubber of proper valcanization to be entirely practical and at present the most desirable composition. When a current is applied to run the motor, the field magnets will draw the armature field to the center of the magnetic field of the field magnets. Engagement of the armature shaft with a driven mechanism which is on an incline so that the rotation of the armature tends to force the armature towards the center of the field magnets. The coupling head $b$, will operate against the lever $f$, to open the brake $e$, on the driven brake-drum $d$, when the engagement of the coupling head $b$, reaches its limit of travel on the incline of its engagement with the driven brake-drum $d$. When the motor current is switched off from the motor the spring $i$, working on the connections $h$ and $g$, through the lever $f$, moves the armature endwise until the engagement of the coupling head $b$, with the driven brake-drum $d$, moved to the extreme of the incline of such engagement is in a position for a repetition of the starting operation and release of brake just heretofore described and the brake e, will be applied. By this device I am able to do away with the extra solenoid required for electrically operated brakes and to enable the motor to make a slight movement to release the brake and get under way before taking up the load and to prevent the racing or drift by applying the brake coincidentally with the release of the motor current.

When the driven brake-drum d is moving to raise the elevator under a heavy load with heavy current, the brake e will be held completely off and upon a cessation of the current will be quickly and fully applied. If the load of the elevator upward is light, the tendency to drift beyond stoppage point is greater than when the load is heavy and the current lifting the load will be less, allowing the brake, if the current is sufficiently light, to be applied slightly while running depending upon the strength of the current to move the armature endwise.

When the load is descending the heavier the load and the greater the tendency of it to drift, the lighter will be the current and the lighter the current on the armature on the shaft a the further it will be deflected from the center of the magnetic field of the motor and through the lever f and the connections h and g the brake e will be applied to the brake-drum d, thus decreasing the tendency of the machine to drift by reason of the heavy load on the driven brake-drum d. Similarly, if the load be light on descent a larger current will be required to lower it against the counter weights, the tendency of the driven brake-drum d to drift will be less and the current will be greater, thereby further releasing the brake e upon the driven mechanism d. In this manner it is found that the drift of the driven mechanism is better controlled by this brake. By the use of the composition balls in the engagement between the motor armature and the driven mechanism, the friction is lessened between the inclined race ways and the shock is absorbed at the end of the travel of the armature shaft a relative to the driven brake-drum d, as illustrated by the diagram in Figure 3.

What I claim as my invention and desire to secure by Letters Patent is:

1. The combination of a motor having an armature adapted to move endwise under the influence of the magnetic fields of the motor; an elevator member driven by said motor; a brake on said driven member adapted to be operated by the endwise movement of said armature; V-shaped race ways in said driven member and a projection on said armature engaging said race ways and adapted to allow the armature to rotate in either direction and move endwise a limited distance before moving the driven mechanism.

2. The combination of a motor having an armature adapted to move endwise; an engaging member on the shaft of said armature; an elevator member; race ways of triangular shape in said driving member on said armature shaft and race ways in said driven member oppositely disposed; balls in said race ways engaging the driving member on said armature shaft and the elevator driven member; a brake on said driven member operated by the endwise movement of said armature.

3. The combination of a motor having an armature adapted to move endwise; an engaging member on the shaft of said armature; an elevator member; race ways of triangular shape in said driving members on said armature shaft and race ways in said driven member oppositely disposed; balls of elastic composition in said race ways engaging the driving member on said armature shaft and the elevator driven member; a brake on said driven member operated by the endwise movement of said armature.

CHARLES E. KIMBALL.